(12) United States Patent
Yan (10) Patent No.: US 11,299,149 B2
(45) Date of Patent: Apr. 12, 2022

(54) CONSIDERATE DRIVING SYSTEM

(71) Applicants: DENSO International America, Inc., Southfield, MI (US); Denso Corporation, Kariya (JP)

(72) Inventor: Yu Yan, Novi, MI (US)

(73) Assignees: DENSO INTERNATIONAL AMERICA, INC., Southfield, MI (US); DENSO CORPORATION

( * ) Notice: Subject to any disclaimer, the term of this patent is extended or adjusted under 35 U.S.C. 154(b) by 189 days.

(21) Appl. No.: 16/042,648

(22) Filed: Jul. 23, 2018

(65) Prior Publication Data

US 2020/0023839 A1 Jan. 23, 2020

(51) Int. Cl.
| | |
|---|---|
| B60W 30/09 | (2012.01) |
| B60W 30/095 | (2012.01) |
| B60W 40/09 | (2012.01) |
| G05D 1/00 | (2006.01) |
| G08G 1/16 | (2006.01) |
| H04W 4/46 | (2018.01) |

(52) U.S. Cl.
CPC ........ *B60W 30/0956* (2013.01); *B60W 40/09* (2013.01); *G05D 1/0088* (2013.01); *G08G 1/166* (2013.01); *H04W 4/46* (2018.02); *B60W 2554/801* (2020.02); *B60W 2554/803* (2020.02); *B60W 2554/804* (2020.02); *G05D 2201/0213* (2013.01)

(58) Field of Classification Search
CPC ............. B60W 30/0956; B60W 40/09; B60W 2554/804; G05D 1/0088; G05D 2201/0213; G08G 1/166; H04W 4/46
See application file for complete search history.

(56) References Cited

U.S. PATENT DOCUMENTS

| | | | |
|---|---|---|---|
| 8,634,980 B1 | 1/2014 | Urmson et al. | |
| 9,533,688 B1* | 1/2017 | Lai ........................ | B60W 40/09 |
| 9,623,876 B1* | 4/2017 | Slusar .................. | G09B 19/167 |
| 9,665,910 B2* | 5/2017 | Chalfant ............... | B60W 40/09 |
| 2014/0195093 A1 | 7/2014 | Litkouhi et al. | |
| 2016/0185388 A1* | 6/2016 | Sim ....................... | B60W 10/20 |
| | | | 701/41 |
| 2017/0032067 A1* | 2/2017 | Kozloski ................. | H04W 4/70 |
| 2017/0185854 A1* | 6/2017 | Lai ...................... | G06F 16/2455 |
| 2017/0369052 A1* | 12/2017 | Nagy .................... | B60W 30/14 |
| 2018/0210446 A1* | 7/2018 | Canavor ........... | H04W 12/0602 |

FOREIGN PATENT DOCUMENTS

CN 103996312 B 12/2015

\* cited by examiner

*Primary Examiner* — Rachid Bendidi
(74) *Attorney, Agent, or Firm* — Dickinson Wright PLLC (57) ABSTRACT

Driving control systems and methods include a first vehicle having one or more processors programmed to receive an individual driving behavior model specific to a driver of a second vehicle proximate the first vehicle. The individual driving behavior model is based on historical driving behavior of the driver of the second vehicle. The one or more processors are programmed to identify a motion plan for the first vehicle based on the individual driving behavior model specific to the driver of the second vehicle, and to control movement of the first vehicle according to the identified motion plan.

12 Claims, 6 Drawing Sheets

*FIG - 6*

CONSIDERATE DRIVING SYSTEM

TECHNICAL FIELD

Aspects of this disclosure generally relate to driving control systems that consider the tendencies of nearby drivers and vehicles.

BACKGROUND

Systems for automatically controlling the driving of a vehicle depend on an ability to accurately model the environment surrounding the vehicle.

SUMMARY

In one exemplary embodiment, a driving control system of a first vehicle includes one or more processors programmed to receive an individual driving behavior model specific to a driver of a second vehicle proximate the first vehicle. The individual driving behavior model is based on historical driving behavior of the driver. Responsive to receiving the individual driving behavior model, the one or more processors are programmed to identify a motion plan for the first vehicle based on the individual driving behavior model, and to control movement of the first vehicle according to the identified motion plan.

In another exemplary embodiment, a manually driven first vehicle includes one or more processors programmed to identify driving behaviors of a driver of the manually driven first vehicle, and to generate an individual driving behavior model specific to the driver based on the driving behaviors. The one or more processors are further programmed to transmit the individual driving behavior model offboard the manually driven first vehicle for a second vehicle that is configured, responsive to receiving the individual driving behavior model, to avoid a collision with the manually driven first vehicle when being driven by the first driver based on the individual driving behavior model.

In a further embodiment, a controller for a first vehicle includes one or more processors and memory storing instructions that, upon execution by the one or more processors, cause the one or more processors to receive an individual driving behavior model specific to a second vehicle traveling proximate the first vehicle. The individual driving behavior model is based on historical driving behavior of the second vehicle. The instructions upon execution further cause the one or more processors to identify a motion plan for the first vehicle based on the individual driving behavior model, and control driving of the first vehicle according to the identified motion plan.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Driving control systems may automatically control a vehicle so as to avoid collisions with objects proximate the vehicle, such as other nearby vehicles on the road, with little or no driver intervention. For example, a vehicle may include driving control systems such as an autonomous driving system (e.g., full and semi-autonomous vehicles), and/or one or more advanced driver assistance systems such as adaptive cruise control (ACC), automated lane centering, and automated emergency Braking (AEB). To affect improved decision making, these systems may be configured to predict how other drivers will behave in various situations. For example, a driving control system may have access to a driving behavior model that, based on the historic driving behaviors of several different drivers, describes how drivers on average behave in a given situation. Thus, when identifying a motion plan for a vehicle that involves the given situation, the driving control system of the vehicle may predict that a manually driven vehicle proximate the vehicle will behave according to the model. This approach, however, assumes that drivers will all behave according to the average behavior represented by the model, which is not always the case. Indeed, individual driving style, reaction time, and comfortability may all cause a driver to deviate from a model reflecting average driver behavior.

Thus, in embodiments described herein, a manually driven vehicle may be configured to identify a current driver of the vehicle, and to identify driving behaviors of the driver while operating the vehicle. For example, the manually driven vehicle may determine whether the driver accelerates or decelerates when another vehicle signals to merge into a lane in front of the driver, whether the driver decelerates when another vehicle does merge into a lane in front of the driver, whether the driver begins decelerating a short distance or a long distance from a stopped object, and so on. Responsive to identifying the driving behaviors of the driver, the manually driven vehicle may be configured to generate an individual driving behavior model that is specific to the driver based on the identified driving behaviors. Unlike the popular driving behavior model described above, an individual driving behavior model may be based on historic driving behavior of the specific driver, and may thus represent the tendencies of the specific driver instead of the population in general.

Responsive to a vehicle with one or more driving control systems becoming proximate to the manually driven vehicle when operated by the identified driver, the manually driven vehicle may transmit the individual driving behavior model specific to the driver to the vehicle having the driving control systems. Thereafter, the driving control systems may be able to predict, based on the individual driving behavior model, how the driver will react in a given situation, including the driver's comfortability, such as if the vehicle including the driving control systems attempts to merge into a lane in front of the driver. The driving control systems may thus be able to generate a motion plan for their vehicle that is based on the individual driving behavior model, and correspondingly that is considerate of the proximate driver's specific tendencies.

Figure 1:
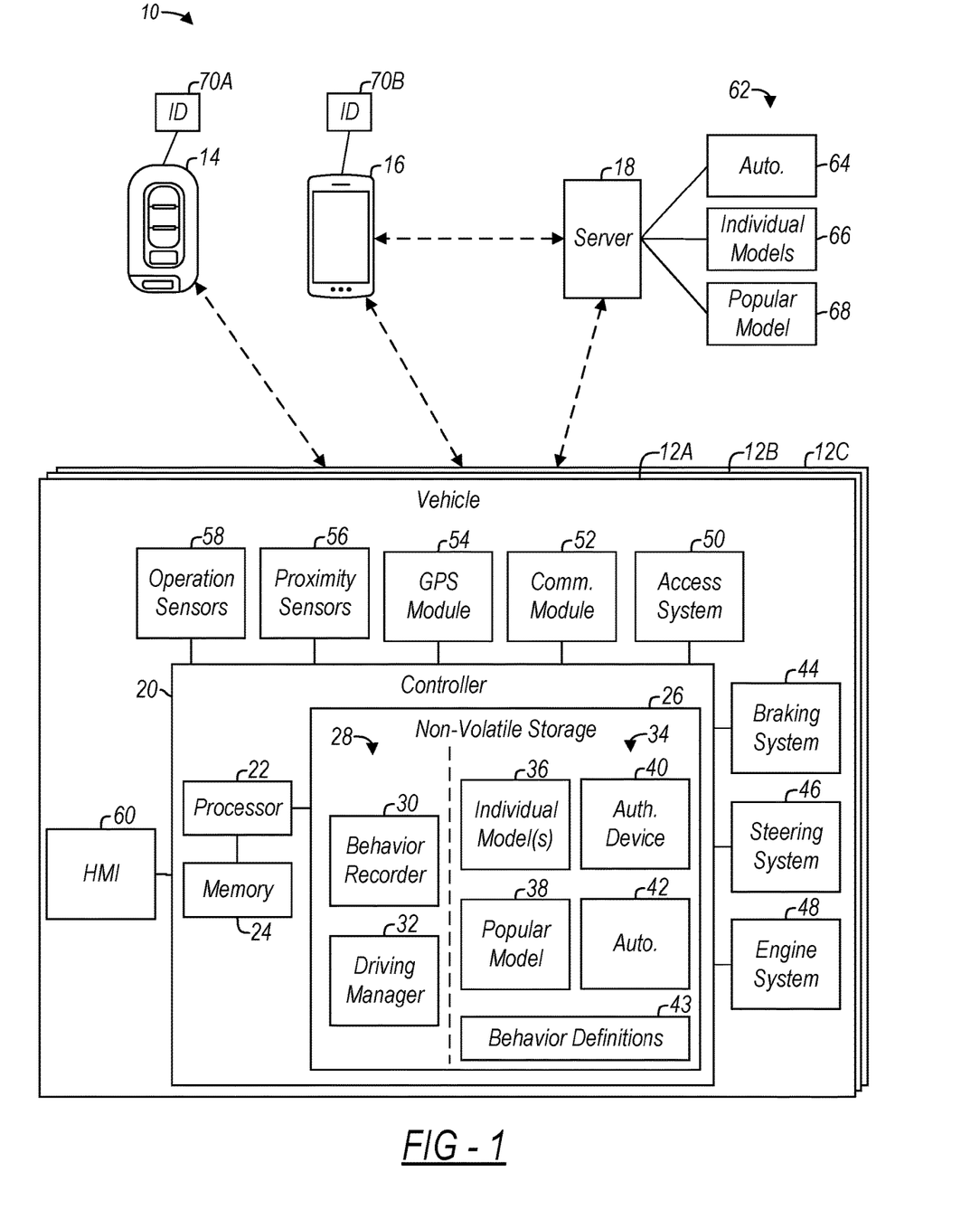
FIG. 1 is a schematic diagram illustrating an exemplary system for implementing considerate driving.

FIG. 1 illustrates a system 10 for implementing a considerate autonomous driving system. The system 10 may include several vehicles 12. Each vehicle 12 may be configured to wirelessly communicate with one or more key fobs 14, one or more mobile devices 16, and a remote server 18. The key fobs 14 and/or mobile devices 16 may be vehicle-specific, such that each vehicle 12 is configured to communicate with and receive commands from a different one or more key fobs 14 and/or a different one or more mobile devices 16.

The vehicles 12 may include at least one autonomous vehicle and at least one manually driven vehicle. For example, the vehicle 12A may be an autonomous vehicle, the vehicle 12B may be a manually driven vehicle, and the vehicle 12C may be either.

Each vehicle 12 may include a controller 20. The controller 20 of each vehicle 12 may be a vehicle controller, such as an electronic control unit ("ECU"). The controller 20 may be configured to implement the features and processes described herein, such as generating and communicating an individual driving behavior model to a nearby autonomous vehicle 12A, and/or controlling motion of an autonomous vehicle 12A based on an individual driving behavior model received from a nearby manually driven vehicle 12B.

The controller 20 of each vehicle 12 may include a processor 22, memory 24, and non-volatile storage 26. The processor 22 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 24. The memory 24 may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage 26 may include one or more persistent data storage devices such as a hard drive, optical drive, tape drive, non-volatile solid-state device, or any other device capable of persistently storing information.

The processor 22 may be configured to read into memory 24 and execute computer-executable instructions embodying vehicle software programs 28, such as a behavior recorder 30 or a driving manager 32, residing in the non-volatile storage 26. The behavior recorder 30 and the driving manager 32 may each be part of an operating system or an application, and may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL. The behavior recorder 30, which may be included in the manually driven vehicle 12B and omitted from the autonomous vehicle 12A, may be configured upon execution to cause the processor 22 to recognize behaviors of a driver of the manually driven vehicle 12B, to generate an individual driving behavior model specific to the driver based on the recognized behaviors, and to communicate the individual driving behavior model to a nearby autonomous vehicle 12A. The driving manager 32, which may be included in the autonomous vehicle 12A and may be omitted from the manually driven vehicle 12B, may be configured upon execution to cause the processor 22 to receive an individual driving behavior model from a nearby manually driven vehicle 12B, and to control motion of the autonomous vehicle 12A based thereon.

The non-volatile storage 26 may also include vehicle data 34 utilized by the controller 20, or more particularly by the vehicle software programs 28, when implementing the features and processes of the controller 20 described herein. For example, the vehicle data 34 may include one or more individual driving behavior models 36, a popular driving behavior model 38, authorized device data 40, autonomous data 42, and behavior definitions 43. Each of the individual driving behavior models 36 may be specific to a different driver identifier, and may include data indicative the driver's driving characteristics based on previous driving behaviors of the driver when confronted with various situations. Conversely, the popular driving behavior model 38 may be based on the previous driving behaviors of several drivers when confronted with various situations, and may thus represent the driving characteristics of the average driver, and how the average driver is likely to react in different situations. The authorized device data 40 may identify external devices, such as a key fob 14 and a mobile device 16, that are authorized to communicate with and/or command the vehicle 12. The autonomous data 42 may include information that supports autonomous operation of the autonomous vehicle 12A, such as models for identifying detected objects proximate the autonomous vehicle 12A, and map data detailing travel infrastructure in various geographic areas. The behavior definitions 43 may define potential driving behaviors of a driver that may serve as a basis for generating an individual driving behavior model 36 for the driver.

The non-volatile storage 26 may further include one or more database structures for collecting, organizing, and enabling fast retrieval of the vehicle data 34 stored therein. For example, the vehicle data 34 may be arranged in one or more relational databases, one or more hierarchical databases, one or more network databases, or combinations thereof. A database management system in the form of computer software executing as instructions on the processor 22 may be used to access the information or data records of the databases in response to a query, which may be dynamically determined and executed by the vehicle software programs 28.

The controller 20 of each vehicle 12 may be in communication with other components of the vehicle 12, such as a braking system 44, a steering system 46, an engine system 48, an access system 50, a communications module 52, a global positioning system (GPS) module 54, various proximity sensors 56, various vehicle operation sensors 58, and a human machine interface (HMI) 60. The controller 20 may be directly connected to one or more of these other components, such as via various input/output (I/O) ports of the controller 20. Additionally, the controller 20 may communicate with one or more of these other components over one or more in-vehicle networks, such as a vehicle controller area network (CAN), an Ethernet network, a media oriented system transfer (MOST) network, and a wireless local area network (WLAN).

The braking system 44, the steering system 46, and the engine system 48 of each vehicle 12 may each be configured to control motion of the vehicle 12, such as at the direction of the controller 20 (for the autonomous vehicle 12A), or at the direction of a driver (for the manually driven vehicle 12B). As an example, at least for the autonomous vehicle 12A, the controller 20, such as upon execution of the driving manager 32, may be configured to identify a motion plan for the autonomous vehicle 12A that avoids collisions with other vehicles proximate the autonomous vehicle 12A. Thereafter, the controller 20 may be configured to cause the autonomous vehicle 12A to operate according to the identified motion plan by transmitting corresponding control signals to the braking system 44, the steering system 46, and the engine system 48. For example, the controller 20 may transmit a control signal to the braking system 44 to slow down or stop the autonomous vehicle 12A, may transmit a control signal to the steering system 46 to turn or adjust a heading of the autonomous vehicle 12A, and may transmit a control signal to the engine system 48 to start an engine of the autonomous vehicle 12A, to speed up the autonomous vehicle 12A to a specified velocity, to maintain a specified velocity, and to shift gears, in accordance with the motion plan.

Alternatively, at least for the manually driven vehicle 12B, a steering wheel may be coupled to the steering system 46, a braking pedal may be coupled to the braking system 44, and an acceleration pedal may be coupled to the engine system 48. A driver of the manually driven vehicle 12B may interact with each of these items to operate the steering system 46, the braking system 44, and the engine system 48 respectively.

The access system 50 of each vehicle 12 may be configured to control access to the vehicle 12, such as at the direction of the controller 20. In particular, the controller 20, such as upon execution of one of the vehicle software programs 28, may be configured to receive user-submitted control commands for the vehicle 12 relating to access, such as a lock command, an unlock command, or a trunk open command. Responsive to receiving such a command, the controller 20 may be configured to communicate a control signal to the access system 50, which may be configured to responsively execute the command. For instance, the access system 50 may be configured to unlock the vehicle 12, lock the vehicle 12, and open a trunk of the vehicle 12 responsive to receiving corresponding control signals from the controller 20.

The communications module 52 of each vehicle 12 may be configured to facilitate wireless communication between the vehicle 12 and other components of the system 10, such as other vehicles 12, a key fob 14, a mobile device 16, and the remote server 18, using radio frequency (RF) transmissions. The other components of the vehicle 12 may communicate with the other system 10 components by accessing the communication capabilities of the communications module 52. Similar to the controller 20 of each vehicle 12, each of the other system 10 components may include a processor, memory, and non-volatile storage including data and software programs that, upon execution by the processor, cause the system 10 component to implement the features and processes of the component described herein. Each of the other system 10 components may likewise include a communications module similar to the communications module 52 that enables the component to wirelessly communicate with the vehicles 12.

As an example, the communications module 52 of each vehicle 12 may include a cellular modem or other wireless network transceiver (e.g., Wi-Fi transceiver) configured to communicate with other system 10 components, such as the remote server 18, over one or more networks, which may include one or more of the Internet, a local area network, a wide area network, and a cellular network to which the cellular modem is subscribed. The remote server 18 may have access to server data 62, which may be stored in the non-volatile storage of the remote server 18, or in a persistent storage device external to the remote server 18, such as a network drive. The server data 62 may include up-to-date versions of the vehicle data 34 that may be stored in the non-volatile storage 26 of each vehicle 12. For example, the server data 62 may include autonomous data 64, which may correspond to the autonomous data 42 that may be stored in one or more of the vehicles 12, such as the autonomous vehicle 12A and the vehicle 12C, may include individual driving behavior models 66, which may correspond to the individual driving behavior models 36 that may be stored in each vehicle 12, and may include a popular driving behavior module 68, which may correspond to the popular driving behavior model 38 that may be stored in one or more of the vehicles 12, such as the autonomous vehicle 12A and the vehicle 12C. Responsive to an update to the server data 62, and/or on request from one of the vehicles 12, the remote server 18 may be configured to transmit the updated or requested server data 62 to the vehicle 12 via the communications module 52.

The communications module 52 of each vehicle 12 may also include one or more wireless transceivers configured to facilitate direct wireless communication with other components of the system 10, such as another vehicle 12, a key fob 14, and a mobile device 16, when these other components are local to (e.g., within direct wireless communication range of) the vehicle 12. To facilitate such local wireless communications, the communications module 52 of each vehicle 12 may include one or more of a Bluetooth transceiver, a ZigBee transceiver, a Wi-Fi transceiver, a radio-frequency identification ("RFID") transceiver, a near-field communication ("NFC") transceiver, a vehicle-to-vehicle (V2V) transceiver, a vehicle-to-infrastructure (V2I) transceiver, and/or additional transceivers designed for other RF protocols particular to remote services provided by the vehicle 12 (e.g., keyless entry, remote start, passive entry passive start).

Each key fob 14 and mobile device 16 authorized to communicate data with and/or command a given vehicle 12 may store a unique ID 70, which may also be stored in the authorized device data 40 of the vehicle 12. Responsive to a user interacting with a key fob 14 or mobile device 16 to request a remote-control command for a vehicle 12, the key fob 14 or mobile device 16 may be configured to wirelessly transmit a command request to the vehicle 12 via the communications module 52. Specifically, the key fob 14 may transmit the command request directly to the vehicle 12. The mobile device 16 may transmit the command request directly to the vehicle 12, or may wirelessly transmit a request over one or more networks to the remote server 18, which may be configured to responsively wirelessly transmit the command request to the vehicle 12 over one or more networks. The command request may indicate the requested command, which may include, without limitation, an unlock request, a trunk open request, a lock request, a remote start request, or a panic request. The command request may also include the ID 70 specific to the key fob 14 or the mobile device 16.

Each vehicle 12 may be configured to receive and process a command request when the vehicle 12 is in an off state or in an on state. Responsive to a vehicle 12 receiving a command request, the controller 20 of the vehicle 12 may be configured to determine whether the key fob 14 or mobile device 16 that initiated the command request is authorized to make the command. For example, the controller 20 may be configured to compare the ID 70 of the received command request with the authorized device data 40 to determine if a match exists. If so, then the controller 20 may be configured to implement the requested command. For example, if the command relates to accessing the vehicle 12, the controller 20 may communicate a control signal corresponding to the requested command to the access system 50 that causes the access system 50 to implement the requested command, such as unlocking the vehicle 12. Alternatively, if the command is a request to start the vehicle 12, the controller 20 may be configured to communicate a control signal to the engine system 48 that causes the engine system 48 start the vehicle 12.

As a further example, responsive to a driver bringing a key fob 14 or mobile device 16 authorized for a given vehicle 12 within a predetermined communication range of a wireless transceiver of the vehicle 12, where the vehicle 12 may include several wireless transceivers each associated with a different access point for the vehicle 12 (e.g., door handle, trunk release, ignition device), the key fob 14 or mobile device 16 may be configured to automatically transmit its ID 70 to the vehicle 12 via the nearby wireless transceiver. Responsively, the controller 20 may be configured to determine whether the ID 70 matches the authorized device data 40. If so, then the controller 20 may be configured to transmit a control signal enabling the access point associated with the nearby wireless receiver. For instance, if the wireless transceiver is associated with a door handle, the controller 20 may be configured to transmit a control signal to the access system 50 that causes the access system 50 to, upon a user interaction with the door handle, unlock the vehicle 12. Alternatively, if the wireless transceiver is associated with an ignition device of the vehicle 12, such as a start button or a key slot, the controller 20 may be configured to transmit a control signal to the engine system 48 that causes the engine system 48 to, upon a user interaction with the start button or key slot (e.g., insertion of and/or turning of the key fob 14), start the vehicle 12.

As another example, responsive to a vehicle 12 being started, a mobile device 16 may be configured to automatically transmit a connection request to the vehicle 12 via the communications module 52 that, if granted, will enable the mobile device 16 to communicate data with the vehicle 12 components. Such a connection may enable the provision of in-vehicle services based on data from the mobile device 16, such as hands-free telephone calling, music streaming, and in-vehicle applications reliant on data from the mobile device 16. The connection request may include the ID 70 specific to the mobile device 16. Responsive to receiving the request, the controller 20 may be configured to compare the ID 70 of the request with the authorized device data 40 to determine whether the connection should be permitted. If a match exists, then the controller 20 may be configured to automatically permit and establish the connection. If not, then the controller 20 may be configured to prompt an occupant of the vehicle 12 for permission, such as via the HMI 60. Responsive to receiving user input granting such permission, the controller 20 may permit the requested connection, and may store the ID 70 of the mobile device 16 in the authorized device data 40 to automatically grant connection requests from the specific mobile device 16 in the future.

The GPS module 54 of each vehicle 12 may be configured to generate GPS data for the vehicle 12, such as via communicating with one or more satellites orbiting Earth. The GPS data may indicate a current geographic location of the vehicle 12, such as by including current longitude and latitude coordinates of the vehicle 12. The GPS module 54 may communicate the GPS data to the controller 20, which may be configured to utilize the GPS data to determine the geographical location of the vehicle 12, and to correspondingly determine the geographic location of objects detected as proximate the vehicle 12. The controller 20 may also be configured to determine a heading of the vehicle 12 based on received GPS data indicating a changed position of the vehicle 12 over a short time span (e.g., one second), which suggests that the vehicle 12 is moving in a direction corresponding to the change in position.

The controller 20, for at least the autonomous vehicle 12A, may be configured, such as upon execution of the driving manager 32, to generate a motion plan for the vehicle 12 based on the GPS data and the autonomous data 42 corresponding to the GPS data, such as map data detailing the travel infrastructure currently in use by the vehicle 12. The controller 20 may then cause the vehicle 12 to implement the motion plan by communicating corresponding control signals to the braking system 44, the steering system 46, and the engine system 48.

The proximity sensors 56 of each vehicle 12 may be configured to detect objects proximate the vehicle 12, and to generate proximity data indicative of the current operating state of each proximate object. An object, which may include other vehicles 12, curbs, guard rails, lane lines, pedestrians, stationary objects in the road such as construction barriers and debris, may be considered as "proximate" the vehicle 12 when the object is within a particular distance from the vehicle 12, which may be based on the detection strength of the proximity sensors 56. The operating state of an object such as a vehicle may include the object's current position relative to the vehicle 12 (e.g., distance and angle), current velocity (e.g., speed and heading), and current acceleration level.

The proximity sensors 56 may be configured to communicate the generated proximity data to the to the controller 20. The controller 20, such as for the manually driven vehicle 12B, may be configured, such as upon execution of the behavior recorder 30, to identify driving behaviors of the driver of the manually driven vehicle 12B given the operating state of detected proximate objects. The controller 20 may then be configured to generate an individual driving behavior model 36 specific to the driver of the manually driven vehicle 12B from the identified behaviors.

As an example, the proximity sensors 56 may include one or more LIDAR sensors. The LIDAR sensors may each be configured to measure a distance to an object external and proximate to a vehicle 12 by illuminating the target with a pulsed laser light and measuring the reflected pulses with a sensor. The LIDAR sensors and/or the controller 20 may then measure the differences in laser return times and, based on these measured differences and the received wavelengths, may generate a digital 3-D representation of the object. The LIDAR sensors and/or the controller 20 may further have the ability to classify various objects based on the 3-D rendering of the object. For example, by determining a shape of the target, the LIDAR sensors and/or controller 20 may classify the object as a passenger vehicle, motorcycle, truck, curb, roadblock, building, pedestrian, and so on. The LIDAR sensors may thus work in conjunction with other vehicle 12 components, such as the controller 20 and other proximity sensors 56, to classify various objects outside of the vehicle 12. The LIDAR sensors may include laser emitters, laser receivers, and any other suitable LIDAR autonomous vehicle sensor components. The LIDAR sensors may further be arranged within a housing configured to rotate to facilitate scanning of the environment.

As a further example, the proximity sensors 56 may include one or more cameras for capturing images of the environment surrounding a vehicle 12. For example, the proximity sensors 56 may include a forward-facing camera that is mounted to the rear-view mirror of the vehicle 12 and is configured to collect image data of the environment in front of the vehicle 12. Similarly, the proximity sensors 56 may include a rear-facing camera that is mounted to the trunk of the vehicle 12 and is configured to collect image data of the environment behind the vehicle 12, and may include side-facing cameras that are mounted to the side view mirrors of the vehicle 12 and are configured to collect image data of the environment to each side of the vehicle 12. The controller 20 may be configured process the image data captured by the one or more cameras of the vehicle 12 to identify conditions around the vehicle 12, including, for example, the existence and operating state of objects proximate the vehicle 12. The controller 20 may be configured to identify such conditions by comparing the location, color, and pattern of pixels within the image data to prestored templates associated with various objects.

As additional examples, the proximity sensors 56 may include one or more radar sensors, one or more ultrasonic sensors, and/or any other sensors for detecting information about the surroundings of the vehicle 12. The proximity sensors 56 may be mounted anywhere on the vehicle. For example, a proximity sensor 56 may be mounted on a roof of the vehicle 12 so as to have a three hundred sixty-degree view of the environment surrounding of the vehicle 12. Additionally, or alternatively, various proximity sensors 56 may surround the vehicle 12 to provide a three hundred sixty-degree view of the vehicle 12. The vehicle 12 may include actuators for adjusting an angle of the field of view of the various proximity sensors 56.

The vehicle operation sensors 58 of each vehicle 12 may be configured to generate vehicle operation data indicative of vehicle 12 operation, or more particularly, how a driver operates the vehicle 12. As some non-limiting examples, the vehicle operation sensors 58 may include a speed sensor configured to measure and indicate a current speed of the vehicle 12, an accelerometer configured to measure and indicate a current acceleration level of the vehicle 12, an odometer configured to measure and indicate a current distance traveled by the vehicle 12, and a gyroscope or compass configured to identify and indicate a current heading of the vehicle 12. The controller 20, such as for the manually driven vehicle 12B, may be configured, such as upon execution of the behavior recorder 30, to identify driving behaviors based on vehicle operation data received from the vehicle operation sensors 58, and to generate an individual driving behavior model 36 specific to the driver of the manually driven vehicle 12B based thereon.

In addition to the vehicle operation sensors 58, the braking system 44, the steering system 46, and the engine system 48 of each vehicle 12 may generate vehicle operation data indicative of a how a vehicle 12 is being operated, which the controller 20 of the manually driven vehicle 12B may utilize to recognize driver behaviors. For example, the braking system 44 may be configured to generate data indicative of utilization of the system by a driver, which may enable the controller 20 to identify when a driver decelerates the manually driven vehicle 12B. The steering system 46 may be configured to generate data indicative of steering wheel positions caused by a driver, which may enable the controller 20 to identify when the manually driven vehicle 12B changes heading. As another example, the engine system 48 may be configured to generate data indicative of engine working speeds caused by a driver, which may enable the controller 20 to identify when a driver accelerates, coasts, or attempts to maintain a speed of the manually driven vehicle 12B.

The HMI 60 of each vehicle 12 may facilitate user interaction with the other vehicle 12 components, such as the controller 20. The HMI 60 may include one or more video and alphanumeric displays, a speaker system, and any other suitable audio and visual indicators capable of providing data from the other vehicle 12 components to the user. The HMI 60 may also include a microphone, physical controls, biometric sensors such as a facial recognition camera and a thumbprint scanner, and any other suitable devices capable of receiving input from a user to invoke functions of the other vehicle 12 components. For example, responsive to a driver submitting biometric data via the biometric sensors, the controller 20 may be configured to check the biometric data against the vehicle data 34 to determine whether the driver is authorized to access and/or drive the vehicle 12. If so, then the controller 20 may communicate a control signal to the access system 50 or the engine system 48 to unlock the vehicle 12 or start the vehicle 12 engine, respectively. The physical controls may include an alphanumeric keyboard, a pointing device (e.g., mouse), keypads, pushbuttons, and control knobs. As a specific example, the physical controls may include steering wheel audio buttons, a push-to-talk button, instrument panel controls, and the like. A display of the HMI 60 may also include a touch screen mechanism for receiving user input.

Figure 2:
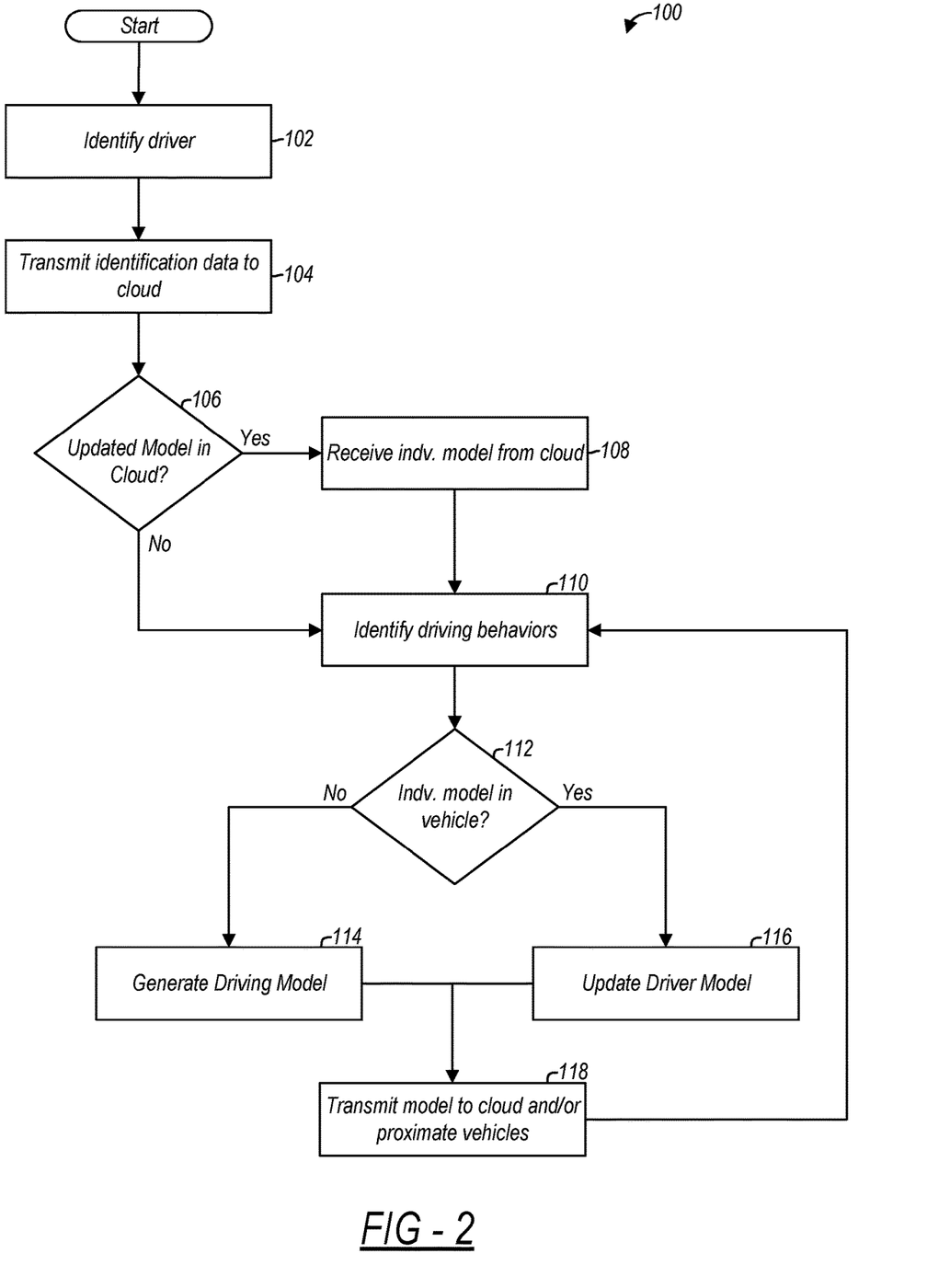
FIG. 2 is a flowchart illustrating an exemplary process for generating an individual driving behavior model.

FIG. 2 illustrates a process 100 for recognizing driver behaviors and generating an individual driving behavior model 36 specific to the driver. The process 100 may be performed by the system 10, or more particularly, by the manually driven vehicle 12B of the system 10.

In block 102, an identity of the current driver of the vehicle 12B may be determined. In particular, the controller 20 of the vehicle 12B, such as upon execution of the behavior recorder 30, may identify a current driver of the vehicle 12B, such as by receiving a driver identifier specific to the current deriver. For example, upon a driver entering and/or starting the vehicle 12B, the controller 20 may cause the HMI 60 to display a prompt requesting the driver to submit his or her driver identifier, such as via selecting or entering an identifier on the display of the HMI 60, or interacting with the biometric sensors of the HMI 60 to generate biometric data, which may serve as the driver identifier.

Alternatively, the controller 20 may identify the current driver based on an ID 70 received from a key fob 14 or a mobile device 16 authorized for the vehicle 12B. Specifically, the controller 20 may assume that each key fob 14 or mobile device 16 having permission to communicate data with or access the vehicle 12B, which may include starting the vehicle 12B engine, is specific to a particular driver. Thus, when a driver uses his or her key fob 14 or mobile device 16 to communicate data with or access the vehicle 12B, the controller 20 may consider the ID 70 received from the key fob 14 or mobile device 16, respectively, as the driver identifier for the current driver. In some embodiments, rather than using received data (e.g., biometric data, ID 70) as the driver identifier, the controller 20 may include a database in the non-volatile storage 26 that links the received data to a driver identifier.

In block 104, the controller 20 may transmit an indication to the remote server 18 that the identified driver is the current driver of the vehicle 12B, such as by communicating the driver identifier to the remote server 18. In addition to the driver identifier, the communication transmitted to the remote server 18 may include a vehicle identifier, such as a vehicle identification number ("VIN") or license plate information (e.g., state and number), that is unique to the vehicle 12B. Responsive to receiving this data, the remote server 18 may be configured to determine whether an individual driving behavior model 66 for the received driver identifier is included in the server data 62. If so, then the remote server 18 may retrieve and mark the individual driving behavior model 66 for the driver identifier as active for the received vehicle identifier. Later, if the manually driven vehicle 12B becomes proximate to the autonomous vehicle 12A while the driver is driving the vehicle 12B, the autonomous vehicle 12A may identify a vehicle identifier for the vehicle, such as using a camera of the autonomous vehicle 12A, and may query the remote server 18 for the individual driving behavior model 66 that is currently marked as active for the vehicle identifier.

Moreover, in block 106, a determination may be made of whether the server data 62 includes an individual driving behavior model 66 associated with the driver identifier that is not present in the non-volatile storage 26 of the manually driven vehicle 12B. Specifically, the non-volatile storage 26 of the manually driven vehicle 12B may include several individual driving behavior models 36, each being associated with a different driver identifier. These individual driving behavior models 36 may have been generated and stored by the controller 20 as various drivers associated with the driver identifiers have operated the manually driven vehicle 12B. However, if the driver identified in block 102 has not previously driven the manually driven vehicle 12B, then the non-volatile storage 26 may not include an individual driving behavior model 36 specific to the driver. Furthermore, if the identified driver drove another manually driven vehicle since last driving the manually driven vehicle 12B, then the non-volatile storage 26 may include an out of date version the individual driving behavior model 36 specific to the driver. Thus, the controller 20 of the manually driven vehicle 12B may be configured to query the remote server 18 with the driver identifier, which may alternatively be part of the communication transmitted in block 104, to determine whether the server data 62 includes an individual driving behavior model 66 for the driver that is not currently stored in the non-volatile storage 26 of the manually driven vehicle 12B.

If so ("Yes" branch of block 106), then in block 108, the controller 20 may receive the individual driving behavior model 66 specific to the driver from the remote server 18, and may store the received individual driving behavior model 66 in the non-volatile storage 26 as one of the individual driving behavior models 36 stored in the vehicle 12B. If not ("No" branch of block 106), then the process 100 may proceed to block 110.

In block 110, driving behaviors may be identified for the driver. Specifically, the controller 20, such as of the manually driven vehicle 12B, may be configured, such as upon execution of the behavior recorder 30, to identify driving behaviors of the driver based on vehicle operation data generated by the braking system 44, the steering system 46, the engine system 48, and the vehicle operation sensors 58, based on proximity data generated by the proximity sensors 56, and based on the behavior definitions 43 stored in the non-volatile storage 26 of the manually driven vehicle 12B.

In particular, each of the behavior definitions 43 may define a potential driving behavior that reflects on the driver's driving characteristics, such as the driver's driving style, skill level, and/or comfortability behind the wheel. Responsive to identifying one of the potential driving behaviors, such as based on the proximity data and/or vehicle operation data, the controller 20 may be configured to record an occurred instance of the potential driving behavior, and to record the proximity data and/or vehicle operation data from which the occurrence was recognized. In this way, the controller 20 may have a record of both the occurrence of the potential driving behavior and the extent of the potential driving behavior.

For example, the potential driving behaviors may include when vehicle operation data indicates excessive speeds relative to a current speed limit, excessive accelerations and decelerations, accelerating through turns, sharp turns, and excessive lane changing, each which may suggest that the driver has a very aggressive driving style. Potential driving behaviors may also include when vehicle operation data indicates low speeds relative to the current speed limit, gradual accelerations and decelerations, wide turns, and few lane changes, each which may suggest that the driver has a cautious driving style.

Many of the defined potential driving behaviors may involve interactions between the vehicle 12B and other objects, such as other vehicles, proximate the manually driven vehicle 12B. For example, a potential driving behavior may include when the vehicle operation data and the proximity data indicate that the driver is slow to decelerate or change lanes when an object having a velocity slower than the vehicle 12B is detected in front of the vehicle 12B, which may suggest that the driver has a poor reaction time. As a further example, a potential driving behavior may include when the vehicle operation data and the proximity data indicate that the driver swerves or decelerates when another object is beside the manually driven vehicle 12B, or when another vehicle of equal or greater velocity merges into the lane of the vehicle 12B in front of the driver, which may suggest that the driver has a low comfort level behind the wheel. As an additional example, a potential driving behavior may include when the vehicle operation data and the proximity data indicate that responsive to another vehicle signaling to enter the lane of the vehicle 12B in front of the vehicle 12B, or to a vehicle entering the lane of the vehicle 12B in front of the vehicle 12B, the driver accelerates and reduces the distance between the other vehicle and the vehicle in front of the vehicle 12B, which may suggest that the driver has and aggressive driving style. Another potential driving behavior may include when the vehicle operation data and the proximity data indicate that responsive to another vehicle signaling to enter the lane of the vehicle 12B in front of the driver, the driver decelerates to let the other vehicle merge, which may suggest that the driver has a cautious driving style.

At least some of the defined potential driving behaviors may include one or more threshold values and/or a time span that enable the controller 20 to recognize the potential driving behavior. For example, a driver may be considered as engaging in the behavior of excessive acceleration if the current acceleration of the vehicle 12B exceeds a set threshold acceleration. As a further example, the driver may be considered as engaging in the behavior of driving at low speeds if a driver controls the vehicle 12B to travel at a speed less than a current speed limit by at least a set threshold value. As an additional example, a driver may be considered as engaging in the behavior of a sharp turn if the heading of the vehicle 12B changes by a value that is greater than a set threshold value within a specified time span.

Responsive to identifying the driving behaviors for the driver, an individual driving behavior model 36 specific to the driver may be generated based on the identified driving behaviors. Specifically, in block 112, the controller 20, such as upon execution of the behavior record 30, may determine whether the manually driven vehicle 12B currently includes an individual driving behavior model 36 associated with the driver identifier determined in block 102, such as in the non-volatile storage 26 of the vehicle 12B. If not ("No" branch of block 112), then in block 114, the controller 20 may generate a new individual driving behavior model 36 for the driver, such as by comparing the identified driver behaviors to the driving behavior model of an average driver (e.g., the popular driving behavior model 38). Alternatively, if an individual driving behavior model 36 is currently stored for the driver identifier ("Yes" branch of block 112), then in block 116, the controller 20 may be configured to update the individual driving behavior model 36 specific to the driver based on the identified driving behaviors.

For example, each individual driving behavior model 36 and the popular driving behavior model 38 may quantify one or more driving characteristics, such as aggressiveness, reaction time, and comfortability, as some non-limiting examples. The quantity for each driving characteristic may be a rating (e.g. an aggressiveness rating, a reaction time rating, a driving comfortability rating), and may be within a range extending from low to high with respect to the driving characteristic. For instance, the range for the aggressiveness rating may extend from very cautious (i.e., very low aggressiveness) to very high aggressiveness, the range for the reaction time rating may extend from very poor to very good, and the range for the driving comfortability rating may extend from very uncomfortable to very comfortable. The rating for a given driving characteristic within the popular driving behavior model 38 may represent the level of the driving characteristic for the average driver, and may be based on observed driving behaviors of several drivers. The rating for a given driving characteristic within an individual driving behavior model 36 may represent the level of the driving characteristic for the driver specific to the individual driving behavior model 36.

The controller 20 may thus be configured to generate an individual driving behavior model 36 specific to the identified driver of the manually driven vehicle 12B by generating ratings for the driver based on the driving behaviors identified in block 110. Each identified driving behavior may indicate a higher than average level of one or more of the driving characteristics, may indicate a lower than average level of one or more of the driving characteristics, and may represent an average level of one or more of the driving characteristics. Thus, for each identified driving behavior, the controller 20 may be configured to generate a rating for each of the one or more driving characteristics implicated by the driving behavior that corresponds to the level of the driving characteristic shown by the driver.

For example, the rating for a given driving characteristic may be low, high, or average. In this case, for a given identified driving behavior implicating the driving characteristic, the controller 20 may select the low rating for the driving characteristic if the driving behavior indicates a less than average level of the driving characteristic, may select the high rating for the driving characteristic if the driving behavior indicates a higher than average level of the driving characteristic, and may select the average level if the driving behavior indicates an average level of the driving characteristic. As an additional example, the rating for a given driving characteristic may include multiple below average values and multiple above average values (e.g., slightly low, very low, slightly high, very high). In this case, for an identified driving behavior implicating such a driving characteristic, the controller 20 may be configured to select the rating for the driving characteristic based on the extent to which the identified driving behavior implicates a high level or a low level of the characteristic, which may be based on the extent the vehicle operation data indicates the driver exceeded a threshold for the identified driving behavior that is included in the behavior definitions 43, or based on the number of times the driving behavior was identified in block 110. For example, if an acceleration level of the driver exceeds the threshold for excessive acceleration by a small amount, the controller 20 may rate the driver as slightly aggressive relative to the excessive acceleration driving behavior. Alternatively, if the driver exceeds the threshold for excessive acceleration by a large amount, the controller 20 may rate the driver as very aggressive for the identified excessive acceleration driving behavior.

Once the controller 20 has computed one or more driving characteristic ratings for each identified driving behavior, the controller 20 may be configured to, for each driving characteristic, average the ratings computed for the driving characteristic and the rating for the driving characteristic included in the previous individual driving behavior model 36 specific to the identified driver, or, if one is not available, the rating for the driving characteristic in the popular driving behavior model 38. Thereafter, the controller 20 may generate a new or updated individual driving behavior model 36 specific to the driver that includes the average for each driving characteristic.

In block 118, the controller 20 of the manually driven vehicle 12B may transmit the new or updated individual driving behavior model 36 specific to the driver offboard the vehicle for an autonomous vehicle 12A that is configured, responsive to receiving the individual driving behavior model 36, to generate a motion plan based on the individual driving behavior model 36. For example, responsive to the manually driven vehicle 12B becoming proximate to an autonomous vehicle 12A while the identified driver is driving the vehicle 12B, and/or to receiving a corresponding request from the autonomous vehicle 12A, the controller 20 of the manually driven vehicle 12B may be configured to transmit the individual driving behavior model 36 specific to the current driver of the vehicle 12B to the autonomous vehicle 12A, such as using the vehicle-to-vehicle wireless transceivers of the vehicles 12. The autonomous vehicle 12A may then utilize the received individual driving behavior model 36 specific to the driver of the manually driven vehicle 12B to generate a motion plan specific to the driving style, skill level, and comfortability of the driver of the manually driven vehicle 12B.

As a further example, responsive to the new or updated individual driving behavior model 36 being generated for the current driver of the manually driven vehicle 12B, the controller 20 of the vehicle 12B may be configured to transmit the individual driving behavior model 36 to the remote server 18. The remote server 18, responsive to receiving the new or updated individual driving behavior model 36, may be configured store the individual driving behavior model 36 as one of the individual driving behavior models 66 stored in the server data 62, such that the new or updated individual driving behavior model 36 is associated with the driver identifier for the current driver of the manually driven vehicle 12B within the server data 62. Thereafter, responsive to an autonomous vehicle 12A becoming proximate to and identifying the manually driven vehicle 12B while being driven by the particular driver, the autonomous vehicle 12A may query the remote server 18 for the individual driving behavior model 66 specific to the driver.

In some embodiments, such as when the manually driven vehicle 12B is part of a public transportation service, the controller 20 of the manually driven vehicle 12B may also be configured to compare the driving behaviors identified in block 110 with a previously generated individual driving behavior model 36 for the current driver or, if one is not available, to the popular driving behavior model 38, to determine whether the driver's performance deviates from the model. If so, then the controller 20 of the manually driven vehicle 12B may be configured to dispatch a notification to a monitoring center, which may then investigate the situation such as by contacting the current driver.

Figure 3:
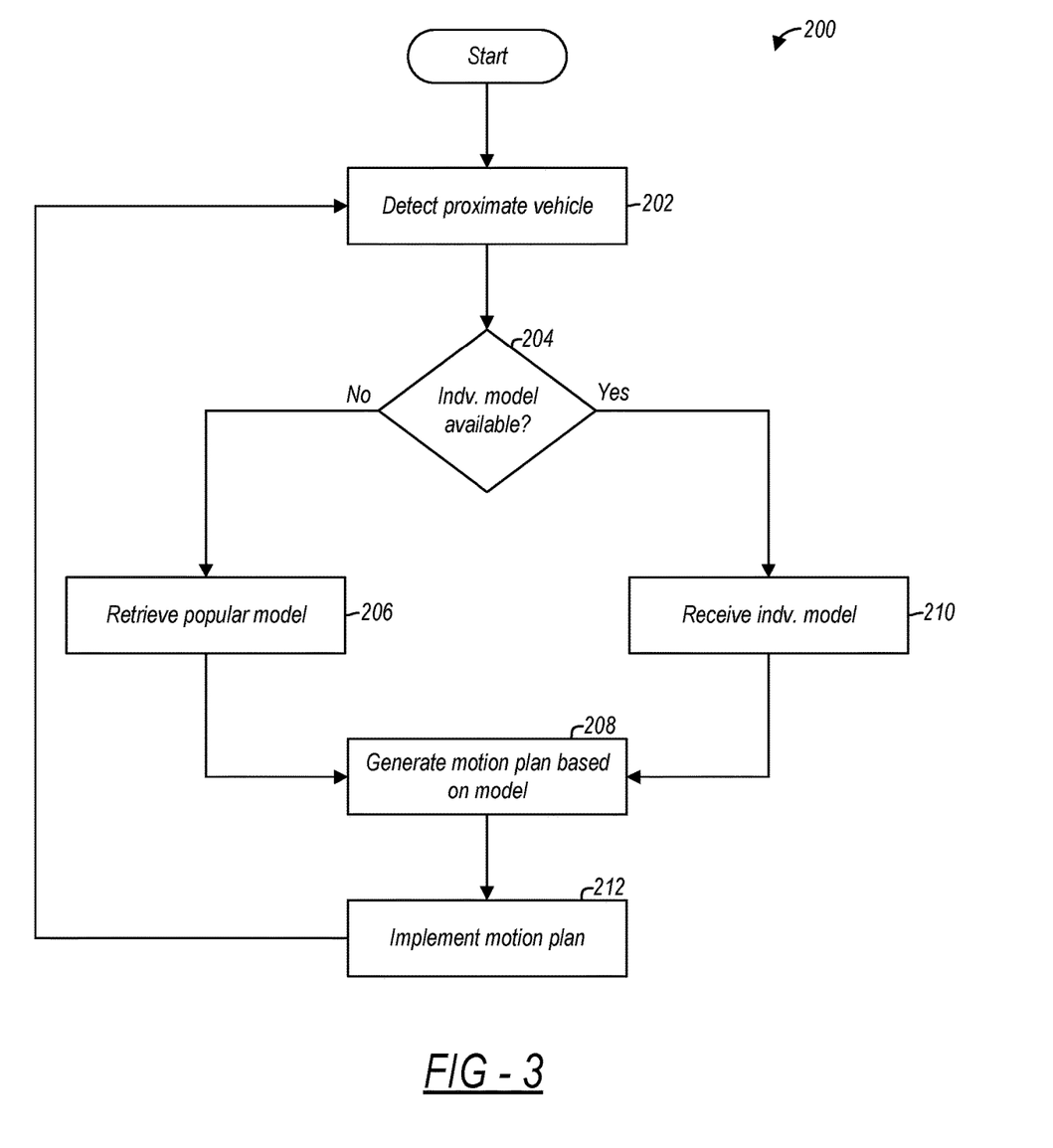
FIG. 3 is a flowchart illustrating an exemplary process for generating a motion plan for a considerate vehicle based on an individual driving behavior model.

FIG. 3 illustrates a process 200 for controlling a vehicle 12 based on an individual driving behavior model 36 specific to a driver of another vehicle proximate the vehicle 12. The process 100 may be performed by the system 10, or more particularly, by the autonomous vehicle 12A of the system 10.

In block 202, the autonomous vehicle 12A may detect another vehicle, such as the manually driven vehicle 12B, proximate to the autonomous vehicle 12A. In particular, the proximity sensors 56 of the autonomous vehicle 12A may communicate proximity data to the controller 20 that indicates the manually driven vehicle 12B is proximate the autonomous vehicle 12A. Responsive to the manually driven vehicle 12B (hereinafter also referred to as "the proximate vehicle 12B") becoming proximate the autonomous vehicle 12A, the controller 20 of the autonomous vehicle 12A may attempt to retrieve an individual driving behavior model 36 specific to the driver of the manually driven vehicle 12B.

Specifically, in block 204, the controller 20 of the autonomous vehicle 12A may determine whether an individual driving behavior model 36 is available for the driver of the proximate vehicle 12B. For example, the controller 20, such as via execution of the driving manager 32, may be configured to query the proximate vehicle 12B for the individual driving behavior model 36 specific to the current driver of the proximate vehicle 12B, such as via the vehicle-to-vehicle transceivers of each vehicle 12.

Alternatively, the controller 20 of the autonomous vehicle 12A may be configured to identify a vehicle identifier unique to the proximate vehicle 12B, and/or a driver identifier unique to the driver of the proximate vehicle 12B, such as via the proximity sensors 56 of the autonomous vehicle 12A. Specifically, the proximity sensors 56 may be configured to sense the vehicle identifier and/or driver identifier from the proximate vehicle 12B. For instance, the vehicle identifier may be located on an external surface of the proximate vehicle 12B, such as on a license plate of the proximate vehicle 12B, and the controller 20 may be configured to recognize the vehicle identifier by processing image data generated by a camera of the vehicle 12 that includes the externally located vehicle identifier. The controller 20 may be configured to recognize the driver identifier from image data captured by the autonomous vehicle 12A. Specifically, the controller 20 may include a facial recognition system that is configured to generate biometric data from the driver's image, which may serve as the driver identifier.

Responsive to determining the vehicle identifier for the proximate vehicle 12B, the controller 20 of the autonomous vehicle 12A may be configured to query the remote server 18 for an active individual driving behavior model 66 associated with the vehicle identifier, which as described above may be the individual driving behavior model 36 specific to the current driver of the proximate vehicle 12B. Responsive to determining the driver identifier, the controller 20 may similarly be configured to query the remote server 18 for an individual driving behavior model 66 associated with the driver identifier within the server data 62, and correspondingly specific to the current driver of the proximate vehicle 12B.

Responsive to the controller 20 of the autonomous vehicle 12A determining that an individual driving behavior model 36, 66 specific to the current driver is not available ("No" branch of block 204), such as based on a corresponding message from the proximate vehicle 12B via the vehicle-to-vehicle transceiver of the vehicles 12, or based on a corresponding message from the remote server 18, in response to the query issued by the controller 20 of the autonomous vehicle 12A, in block 206, the controller 20 may be configured to retrieve the popular driving behavior model 38, such as from non-volatile storage 26, to model the likely behavior of the driver of the proximate vehicle 12B. Thereafter, in block 208, the controller 20 of the autonomous vehicle 12A may be configured to generate a motion plan for the autonomous vehicle 12A based on the popular driving behavior model 38. In other words, the controller 20 may plan driving actions for the vehicle 12 assuming that the driver of the proximate vehicle 12B will react according to the popular driving behavior model 38.

Alternatively, responsive to an individual driving behavior model 36, 66 specific to a current driver of proximate vehicle 12B being available ("Yes" branch of block 204), in block 210, the controller 20 may receive the individual driving behavior model 36, 66 specific to the current driver of the proximate vehicle 12B. For instance, responsive to receiving a query from the autonomous vehicle 12A, the proximate vehicle 12B may communicate the individual driving behavior model 36 specific to the current driver of proximate vehicle 12B to the autonomous vehicle 12A via the vehicle-to-vehicle transceivers of the vehicles 12. Alternatively, responsive to receiving the query from the autonomous vehicle 12A, the remote server 18 may communicate the individual driving behavior model 66 specific to the current driver of proximate vehicle 12B to the autonomous vehicle 12A. Thereafter, in block 208, the controller 20 of the autonomous vehicle 12A may generate a motion plan for the autonomous vehicle 12A based on the individual driving behavior model 36 specific to current driver of proximate vehicle 12B. In other words, the controller 20 may plan one or more driving actions for the autonomous vehicle 12A assuming that the driver of the proximate vehicle 12B will react according to the individual driving behavior model 36, 66 specific to the driver.

In some embodiments, the controller 20 of the autonomous vehicle 12A may also be configured to generate the motion plan for the autonomous vehicle 12A based on the individual driving behavior models 36, 66 specific to passengers of the vehicle 12A, and/or on the individual driving behavior models 36, 66 specific to passengers of the proximate vehicle 12B. For instance, a given individual driving behavior model 36, 66 specific to a passenger may include data representing the passenger's comfortability preferences, such as via the comfortability rating. For example, a low comfortability rating for the passenger may indicate that the passenger is not comfortable with aggressive maneuvers such as large accelerations and fast heading changes, and may also indicate that the passenger is not comfortable when a vehicle enters a lane between two other vehicles if there is less than a threshold distance between the two other vehicles. The controller 20 of the autonomous vehicle 12A may take this into account when generating a motion plan.

Specifically, each vehicle 12 may be configured to identify passengers currently present in the vehicle 12. For example, each vehicle 12 may include biometric sensors specific to passenger areas that are configured to receive biometric data from passengers, which may serve as or be used to determine identifiers for the passengers, such as via a lookup table stored in the non-volatile storage 26. Alternatively, passenger identifiers may be provided to the controller 20 of a vehicle 12 via interaction with the HMI 60. As a further alternative, a passenger may interact with his or her mobile device 16 to directly transmit an identifier, such as the identifier 70B unique to the mobile device 16, to the controller 20 of the vehicle 12, which may then serve as a passenger identifier.

Responsive to a controller 20 of one of the vehicles 12 identifying that a passenger is present in the vehicle 12, and to determining the identifier specific to the passenger, the controller 20 may be configured to check whether the non-volatile storage 26 of the vehicle 12 includes an individual driving behavior model 36 for the passenger identifier. If not, the controller 20 may transmit a model request to the remote server 18 that includes the passenger identifier. If the server data 62 includes an individual driving behavior model 66 for the passenger identifier, the controller 20 may download the individual driving behavior model 66 for the passenger identifier in response, and store the model as one of the individual driving behavior models 36 in the non-volatile storage 26.

Assuming the manually driven vehicle 12B or the vehicle 12C includes the passenger, responsive to the vehicle becoming proximate the autonomous vehicle 12A, the proximate vehicle may be configured to communicate the individual driving behavior model 36 for the passenger identifier to the autonomous vehicle 12A, such as via the vehicle-to-vehicle transceivers of each vehicle. The controller 20 of the autonomous vehicle 12A may then further base generation of the motion plan for the autonomous vehicle 12A on the individual driving behavior model 36 specific to the passenger of the other vehicle, and also may base generation of the motion plan on received individual driving behavior models 36 specific to passengers of the autonomous vehicle 12A.

As a further example, responsive to a passenger entering the manually driven vehicle 12B or the vehicle 12C, the passenger may interact with his or her mobile device 16 to communicate to the remote server 18 an indication that the passenger is present in the vehicle. For example, the communication may include an identifier for the passenger and an identifier unique to the vehicle in which the passenger is present. Responsive to receiving the communication, the remote server 18 may be configured to note that the passenger is currently present in the vehicle in the server data 62. Thereafter, responsive to the vehicle becoming proximate the autonomous vehicle 12A, the controller 20 of the autonomous vehicle 12A may be configured to determine an identifier for the vehicle as described above, and thereafter to transmit a model request to the remote server 18 that includes the vehicle identifier. Responsive to receiving the request, the remote server 18 may communicate the individual driving behavior model 66 for each passenger noted as being present in the vehicle associated with the vehicle identifier. Similarly, responsive to a passenger entering the autonomous vehicle 12A, the passenger may interact with his or her mobile device 16 to communicate to the remote server 18 that he or she is present in the autonomous vehicle 12A. Responsively, the remote server 18 may communicate the individual driving behavior model 66 specific to the passenger to the autonomous vehicle 12A. The controller 20 of the autonomous vehicle 12A may then be configured to consider the individual driving behavior model 66 specific to the passenger of the proximate vehicle, and/or consider the individual driving behavior model 66 specific to the passenger of the autonomous vehicle 12A, when generating a motion plan for the autonomous vehicle 12A.

In block 212, the controller 20 may control the autonomous vehicle 12A according to the generated motion plan. Specifically, the controller 20, such as via execution of the driving manager 32, may be configured to transmit control signals to the braking system 44, the steering system 46, and the engine system 48 that cause the autonomous vehicle 12A to move according to the motion plan generated in block 208.

Figure 4:
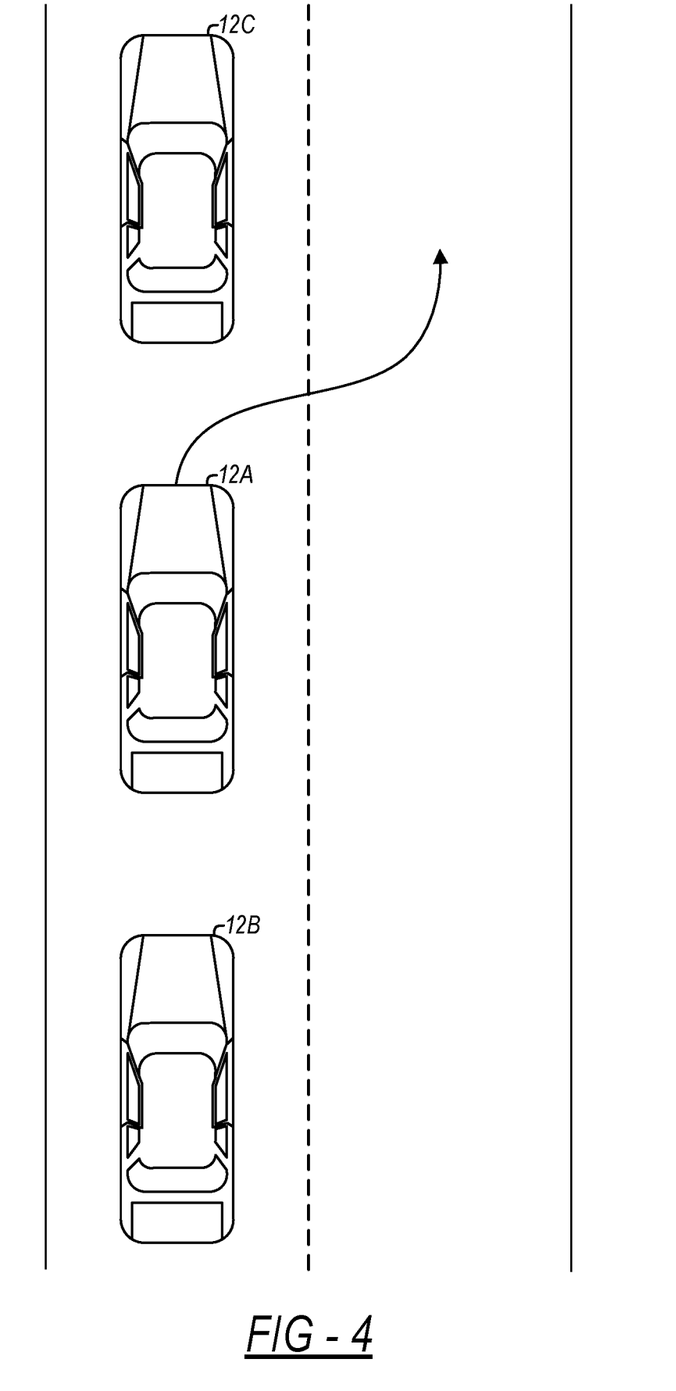
FIG. 4 is a diagram illustrating an exemplary road situation that may be confronted by the considerate driving system of FIG. 1.
Figure 5:
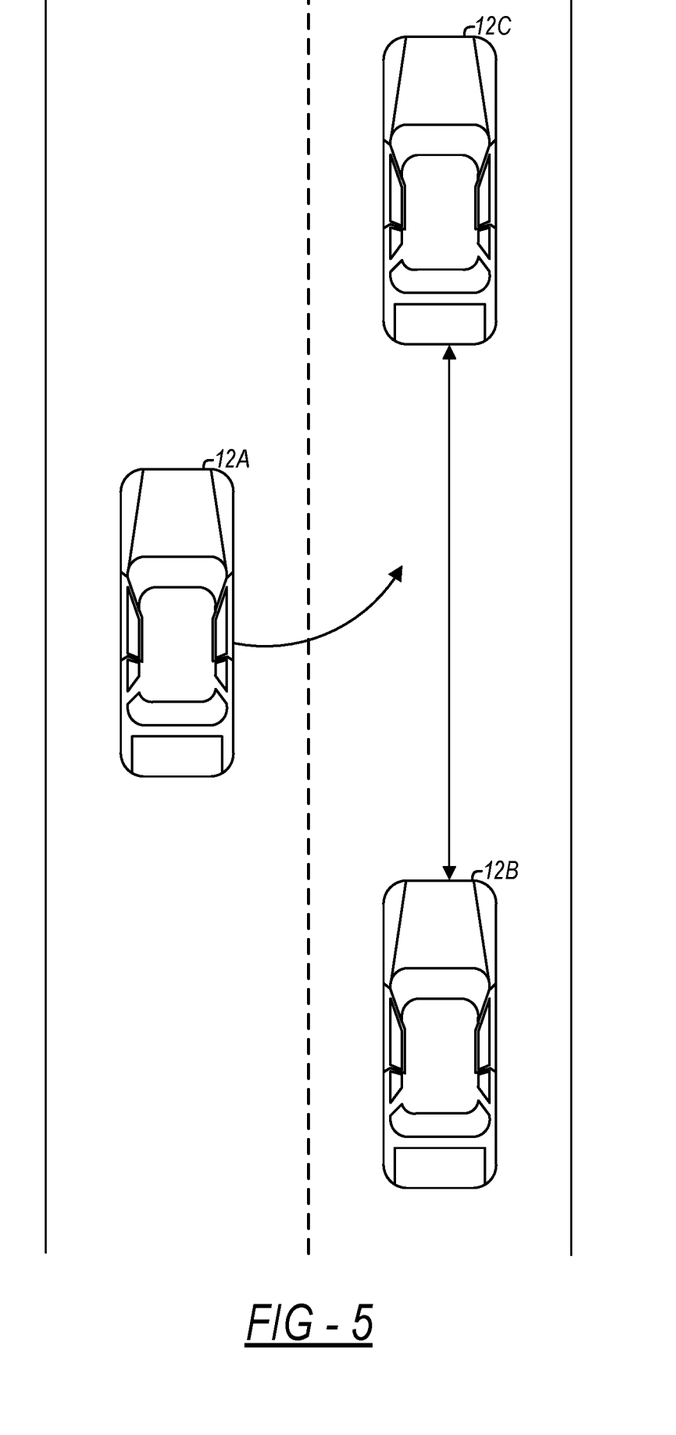
FIG. 5 is a diagram illustrating another exemplary road situation that may be confronted by the considerate driving system of FIG. 1.
Figure 6:
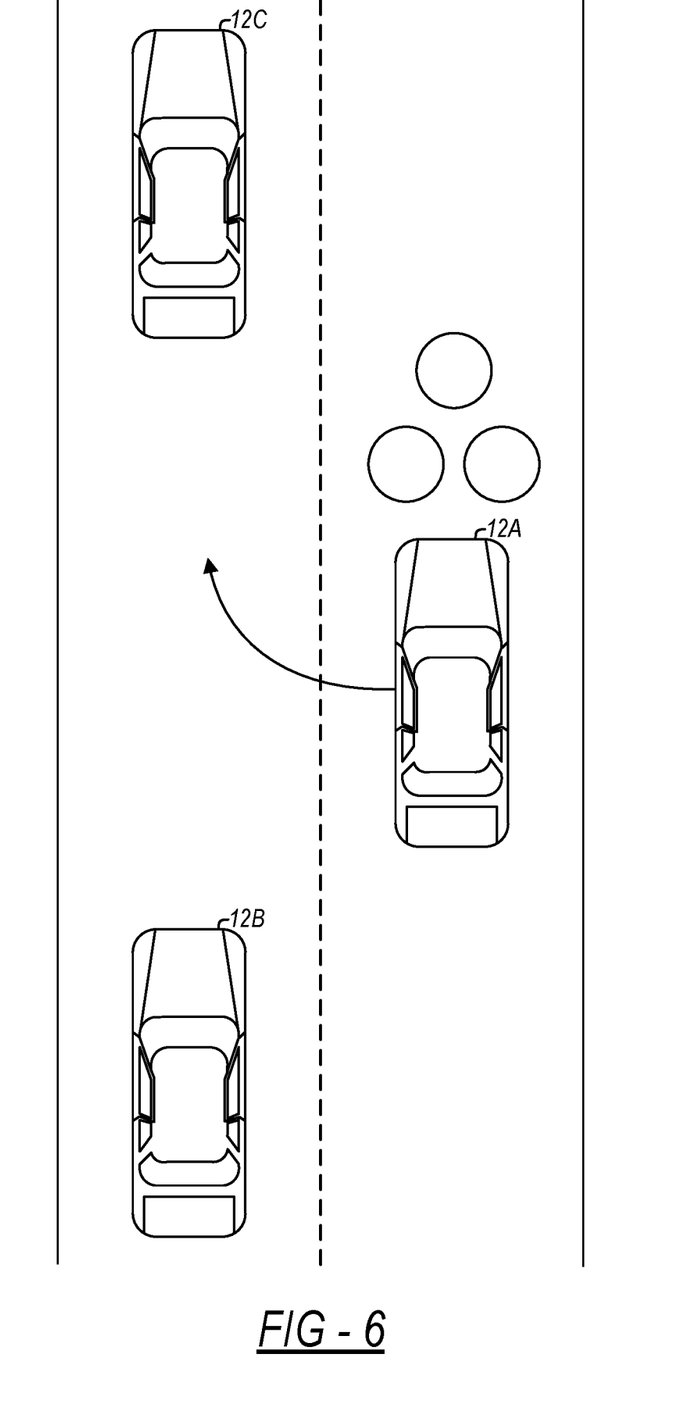
FIG. 6 is a diagram illustrating a further exemplary road situation that may be confronted by the considerate driving system of FIG. 1.

FIGS. 4 through 6 illustrate examples of how an autonomous vehicle 12A may generate a motion plan based on an individual driving behavior model 36 specific a current driver of a manually driven vehicle 12B proximate the autonomous vehicle 12A. Referring to FIG. 4, the autonomous vehicle 12A may be driving behind another vehicle 12C, and may be followed by the manually driven vehicle 12B. Responsive to the vehicle 12C stopping or decelerating suddenly, the autonomous vehicle 12A may consider changing to an open lane adjacent to the lane of the vehicles 12 without slowing down. However, doing so in this situation may be dangerous, as the driver of the manually driven vehicle 12B may not be aware of the sudden stopping or deceleration of the vehicle 12C, and the driver may not have a good enough of a reaction time to avoid a collision with the vehicle 12C after the autonomous vehicle 12A has exited the lane.

Thus, responsive to receiving the individual driving behavior model 36 specific to the driver the manually driven vehicle 12B, the controller 20 of the autonomous vehicle 12A may be configured to consider the reaction time rating of in the individual driving behavior model 36 to predict whether the driver will be able to handle the situation if the autonomous vehicle 12A changes lanes without slowing down. Specifically, the controller 20 of the autonomous vehicle 12A may include a function that maps a current operating state of the manually driven vehicle 12B, such as indicated in proximity data generated by the proximity sensors 56 of the autonomous vehicle 12A, and the rating for a given driving characteristic, such as reaction time, to a minimum distance likely needed between the vehicle 12C and the manually driven vehicle 12B for the driver of the manually driven vehicle 12B to react and safely avoid a collision with the vehicle 12C. If this distance is less than the measured distance between the vehicle 12C and the manually driven vehicle 12B, which may likewise be indicated by proximity data generated by the proximity sensors 56 of the autonomous vehicle 12A, then the controller 20 of the autonomous vehicle 12A may cause the autonomous vehicle 12A to change lanes. If not, then the controller 20 may cause the autonomous vehicle 12A to decelerate, which in turn may cause the driver of the manually driven vehicle 12B to decelerate, and the controller 20 may then reevaluate the situation.

Referring to FIG. 5, the autonomous vehicle 12A may be traveling in a lane adjacent to a lane in which the vehicle 12C is traveling followed by the manually driven vehicle 12B. In this case, the controller 20 of the autonomous vehicle 12A may determine that the distance between the vehicle 12C and the manually driven vehicle 12B, which may be indicated in the proximity data generated by the proximity sensors 56 of the autonomous vehicle 12A, is greater than a safe distance for the autonomous vehicle 12A to merge into the adjacent lane between the vehicle 12C and the manually driven vehicle 12B. However, the controller 20 of the autonomous vehicle 12A may also be configured to determine whether to merge based on the individual driving behavior model 36 specific to the current driver of the manually driven vehicle 12B, or more particularly, based on the comfortability rating.

In particular, the controller 20 of the autonomous vehicle 12A may be configured to input the current operating state of the manually driven vehicle 12B and the comfortability rating into a function that maps these items to a minimum distance likely needed between the manually driven vehicle 12B and the vehicle 12C for the autonomous vehicle 12A to merge without the driver of the manually driven vehicle 12B becoming nervous or uncomfortable, which may lead to the driver performing a dangerous on-road action such as a hard brake or a swerve. If the minimum distance is greater than the distance between the manually driven vehicle 12B and the vehicle 12C, which may be indicated in the proximity data generated by the proximity sensors 56 of the autonomous vehicle 12A, then the controller 20 of the autonomous vehicle 12A may determine not to merge until more space is between the vehicles. If the minimum distance is less than the distance between the manually driven vehicle 12B and the vehicle 12C, then the controller 20 may cause the autonomous vehicle 12A to merge.

FIG. 6 illustrates a further example of the controller 20 of the autonomous vehicle 12A generating a motion plan based on the individual driving behavior model 36 specific to a driver of a manually driven vehicle 12B proximate the autonomous vehicle 12A. As shown in the illustrated embodiment, the autonomous vehicle 12A may be stopped behind some road debris or construction barriers, and may be contemplating whether it should enter a lane of the of the manually driven vehicle 12B in front of the vehicle 12B, such as based on the aggressiveness rating, the reaction time rating, and/or the comfortability rating included in the individual driving behavior model 36 specific to the driver of the manually driven vehicle 12B.

Specifically, for each of these ratings, the controller 20 of the autonomous vehicle 12A may be configured to input the detected operating state of the manually driven vehicle 12B, which may be indicated in the proximity data generated by the proximity sensors 56 of the autonomous vehicle 12A, and the rating into a function that outputs a minimum distance likely needed between the autonomous vehicle 12A and the vehicle 12B in which, should the autonomous vehicle 12A attempt to change lanes, the driver of the manually driven vehicle 12B is not likely to be problematic relative to the rating.

For instance, the controller 20 may determine a minimum distance needed between the vehicles such that the driver of the manually driven vehicle 12B is not likely to accelerate and block the autonomous vehicle 12A, a minimum distance needed between the vehicles such that the manually driven vehicle 12B is likely to have enough time to react if necessary, and a minimum distance needed between the vehicles such that the manually driven vehicle 12B is not likely to feel uncomfortable with the merging of the vehicle 12A, which may cause the driver to dangerously swerve or break. If any of these minimum distances is greater than the distance detected between the autonomous vehicle 12A and the manually driven vehicle 12B, which may be indicated in proximity data generated by the proximity sensors 56 of the autonomous vehicle 12A, then the controller 20 of the autonomous vehicle 12A may wait for a better opportunity to change lanes. Alternatively, if all of these minimum distances are less than the detected distance between the vehicles, then the controller 20 may generate a motion plan that causes the autonomous vehicle 12A to merge. In alternative embodiments, the controller 20 of the autonomous vehicle 12A may be configured to average the minimum distance determined for each rating, and compare the average to the detected distance between the vehicles to determine whether to merge.

In some embodiments, another autonomous vehicle may also be configured to implement processes and features similar to those discussed throughout this description for the manually driven vehicle 12B. For example, the vehicle 12C may be an autonomous vehicle that includes a controller 20 configured, similar to the controller 20 of the autonomous vehicle 12A, to identify a motion plan for the vehicle 12C based on proximity data generated by proximity sensors 56, GPS data generated by a GPS module 54, and autonomous data 42 stored in non-volatile storage 26, and to implement the motion plan by sending corresponding control signals to the braking system 44, steering system 46, and engine system 48 of the vehicle 12C.

In addition, the vehicle 12C may be configured to perform a process similar to the process 100, but the individual driving behavior model 36 generated and stored by the vehicle 12C may be specific to the vehicle 12C instead of a specific driver. In other words, the individual driving behavior model 36 may represent the driving characteristics of the controller 20 when autonomously controlling the vehicle 12C, such as via execution of the driving manager 32, and may be generated by the controller 20 of the vehicle 12C, such as via execution of the behavior recorder 30, based on driving behaviors implemented by the driving manager 32 during autonomous operation of the vehicle 12C, and/or based on the algorithm by which the driving manager 32 identifies a motion plan for the vehicle 12C. The remote server 18 may also include an individual driving behavior model 66 specific to the vehicle 12C, and may associate a vehicle identifier for the vehicle 12C with the individual driving behavior model 66 within the server data 62.

Thus, the controller 20 of the autonomous vehicle 12A may be configured to perform a process similar to the process 200 relative to the autonomous vehicle 12C, but the controller 20 may be configured to receive and utilize an individual driving behavior model 33, 66 specific to the vehicle 12C instead of to a current driver of the vehicle 12C. Specifically, responsive to the autonomous vehicle 12C becoming proximate the autonomous vehicle 12A, the controller 20 of the autonomous vehicle 12A may be configured to request an individual driving behavior model 36 specific to the autonomous vehicle 12C from the vehicle 12C, such as via the vehicle-to-vehicle transceiver of each vehicle. Alternatively, the controller 20 of the autonomous vehicle 12A may be configured to request an individual driving behavior model 66 specific to the autonomous vehicle 12C from the remote server 18, such as based on an identifier for the vehicle 12C identified by the controller 20 of the autonomous vehicle 12A via the proximity sensors 56 of the autonomous vehicle 12A. If no individual driving behavior model 36, 66 specific to the vehicle 12C is available, then the controller 20 of the autonomous vehicle 12A may be configured to generate a motion plan for the autonomous vehicle 12A using the popular driving behavior model 38 for the vehicle 12C. Alternatively, if an individual driving behavior model 36, 66 specific to the vehicle 12C is available, then the controller 20 of the vehicle 12A may receive the model from the vehicle 12C or the remote server 18, and identify the motion plan for the autonomous vehicle 12A based thereon.

Whether or not the vehicle 12A is an autonomous vehicle, which may include the vehicle 12A being a full autonomous or semi-autonomous vehicle, the vehicle 12A may be configured with one or more advanced driver assistance systems such as ACC, automated lane centering, and AEB. For example, the controller 20 of the vehicle 12A may be configured to implement ACC by identifying the distance between the vehicle 12A and another vehicle 12 in front of the of the vehicle 12A based on proximity data generated by the proximity sensors 56, and to automatically control the vehicle 12A to maintain a safe and substantially constant distance between the vehicle 12A and the vehicle 12 in front of the vehicle 12A, such as by transmitting command signals to the braking system 44 and the engine system 48 based on the identified distance. As a further example, the controller 20 of the vehicle 12A may be configured to implement automated lane centering by identifying the location of lane lines relative to the vehicle 12A based on the proximity data generated by the proximity sensors 56, and to automatically control the vehicle 12A to maintain at least a set minimum distance from each lane line, such as by transmitting command signals to the steering system 56 based on the identified lane line locations. As another example, the controller 20 of the vehicle 12A may be configured to implement AEB by monitoring for stationary objects or objects of a velocity slower than the vehicle 12A within a set distance of and in a current movement direction of the vehicle 12A, and to automatically control the vehicle 12A to slow down so as to avoid or lessen the impact of a collision with a detected object, such as by transmitting corresponding command signals to the braking system 44.

Similar to the exemplary embodiments discussed, above, when the vehicle 12A is configured to implement one or more advanced driving assistance systems, the controller 20 of the vehicle 12A may be configured to utilize a received individual driving behavior model specific to a proximate driver or vehicle 12 to determine whether the controller 20 should control movement of the vehicle 12A according such advanced driving assistance systems, and to what extent. For example, if an individual driving behavior model received for a driver traveling directly behind the vehicle 12A indicates that the driver has poor reaction time or is a relatively uncomfortable driver, then the controller 20 may be configured to cause the vehicle 12A to implement AEB such that decelerations of the vehicle 12A are slower than decelerations that would be used if the following driver had average comfortability and reaction time, if possible. As another example, if the individual driving behavior model received for a driver traveling directly in front of the vehicle 12A indicates that the driver has a poor reaction time, is a relatively uncomfortable driver, or a relatively aggressive driver, then the controller 20 may be configured to cause the vehicle 12A to implement ACC such that the vehicle 12A maintains a distance between the vehicle 12A and the driver that is greater than would be maintained by the controller 20 if the driver had average or above average comfortability and response time, and average or below average aggressiveness. As a further example, if an individual driving behavior model received for a driver traveling alongside the vehicle 12A indicates the driver has a lower than average comfortability, then the controller 20 of the vehicle 12A may be configured to implement automated lane centering such that the minimum distance maintained between the vehicle 12A and a lane between the vehicle 12A and the adjacent driver is greater than a minimum distance that would be maintained if the adjacent driver had an average or high comfortability.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence/lane diagrams, and/or block diagrams. In certain alternative embodiments, the functions, acts, and/or operations specified in the flowcharts, sequence/lane diagrams, and/or block diagrams may be re-ordered, processed serially, and/or processed concurrently consistent with embodiments of the invention. Moreover, any of the flowcharts, sequence/lane diagrams, and/or block diagrams may include more or fewer blocks than those illustrated consistent with embodiments of the invention.

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A driving control system of a first vehicle, comprising:
one or more processors programmed to
responsive to receiving an individual driving behavior model specific to an individual driver of a second vehicle proximate the first vehicle, the individual driving behavior model being based on historical driving behavior of the individual driver of the second vehicle, identify a motion plan for the first vehicle based on the individual driving behavior model pertaining to the second vehicle and responsive to historic tendencies of the driver of the second vehicle, wherein the processor is further programmed to identify a vehicle identifier unique to the second vehicle responsive to image data of an external surface of the second vehicle generated by a camera of the first vehicle, and to identify a driver identifier of a second vehicle driver in response to a driver's image, wherein the individual driving behavior model is retrieved from a remote server in response to the vehicle identifier and driver identifier; and
control movement of the first vehicle according to the identified motion plan based on the individual driving behavior model utilizing both the vehicle identifier and driver identifier.

2. The driving system of claim 1, wherein the one or more processors are programmed to, responsive to determining that the individual driving behavior model for the driver of the second vehicle is not available, identify the motion plan for the first vehicle based on a popular driving behavior model based on at least historic driving of several different drivers.

3. The driving system of claim 1, wherein the individual driving behavior model includes an aggressiveness rating, a reaction time rating, and a driving comfortability rating specific to the individual driver.

4. The driving system of claim 1, wherein the individual driving behavior model indicates an aggressiveness rating of the driver, and the one or more processors are programmed to identify the motion plan for the first vehicle based on the individual driving behavior model by being programmed to identify whether the first vehicle should enter a lane of the second vehicle in front of the second vehicle based on the aggressiveness rating.

5. The driving system of claim 1, wherein the individual driving behavior model indicates a reaction time rating for the driver, and the one or more processors are programmed to identify the motion plan for the first vehicle based on the individual driving behavior model by being programmed to identify whether the first vehicle should enter a lane of the second vehicle in front of the second vehicle based on the reaction time rating.

6. The driving system of claim 1, wherein the individual driving behavior model indicates a driving comfortability rating for the driver, and the one or more processors are programmed to identify the motion plan for the first vehicle based on the individual driving behavior model by being programmed to identify the motion plan based on the driving comfortability rating for the driver.

7. The driving system of claim 6, wherein a distance between the second vehicle and a third vehicle driving immediately in front of the second vehicle is greater than a safe merging distance for the first vehicle, and the one or more processors are programmed to not cause the first vehicle to enter a lane of the second vehicle between the second vehicle and the third vehicle based on the driving comfortability rating for the driver and the distance between the second vehicle and the third vehicle.

8. The driving system of claim 1, wherein the identification of the motion plan for the first vehicle is further based on an individual driving behavior model specific to a passenger of the second vehicle.

9. The driving system of claim 1, wherein the individual driving behavior model is received from the second vehicle responsive to the second vehicle becoming proximate to the first vehicle.

10. The driving system of claim 1, wherein the one or more processors are programmed to retrieve the individual driving behavior model from a remote server based on an identifier for the second vehicle detected via a camera of the first vehicle.

11. The driving system of claim 1, wherein the one or more processors are programmed to:
identify a passenger currently present in the second vehicle; and
responsive to identifying the passenger, download, from a remote server, an individual driving behavior model specific to only the passenger, wherein the motion plan for the first vehicle is further identified by the one or more processors based on the individual driving behavior model specific to the passenger.

12. A controller for a first vehicle comprising:
one or more processors; and
memory storing instructions that, upon execution by the one or more processors, cause the one or more processors to
receive an individual driving behavior model specific to a second vehicle traveling proximate the first vehicle, the individual driving behavior model being based on historical driving behavior of an individual driver associated with the second vehicle, identify a motion plan for the first vehicle based on the individual driving behavior model pertaining to the individual driver associated with the second vehicle, wherein the processor is further programmed to identify a vehicle identifier unique to the second vehicle responsive to image data of an external surface of the second vehicle generated by a camera of the first vehicle, and to identify a driver identifier of a second vehicle driver in response to a driver's image, wherein the individual driving behavior model is retrieved from a remote server in response to the vehicle identifier and driver identifier; and
control driving of the first vehicle according to the identified motion plan based on the individual driving behavior model utilizing both the driver identifier and the vehicle identifier.

* * * * *